Patented July 29, 1947

2,424,736

UNITED STATES PATENT OFFICE 2,424,736

RUBBER COMPOSITION AND METHOD OF MAKING SAME

Stewart L. Brams, Dayton, Ohio, assignor to General Motors Corporation, Detroit, Mich., a corporation of Delaware No Drawing. Application February 23, 1944, Serial No. 523,574

7 Claims. (Cl. 260—41)

This invention relates to an adhesive composition for cementing rubber or rubberlike material to metal and to a method for manufacturing such a composition, this application being a continuation in part of my copending application Serial No. 474,170, filed January 30, 1943.

An object of the invention is to provide adhesive compound which will form adhesive bonds between rubber or rubber-like material and metal parts such as steel, iron, brass and aluminum, etc.

In carrying out the above object it is a further object to provide a cement which includes large quantities of channel carbon black having a surface area within a predetermined range which carbon black is incorporated in the rubber or rubber-like material and wherein the entire mixture is carried by a suitable solvent.

A still further object of the invention is to provide an adhesive compound wherein rubber or rubberlike material is utilized together with channel carbon black having a grain size preferably of 28 millimicrons and wherein the channel carbon black is in quantities greater than 100% of the rubber. In some instances it may be desirable to include plasticizers, accelerators, age-resistors or vulcanizing agents together with resinous materials, an example of which is, cyclized rubber known in the trade as "Pliolite." These addition agents may vary according to the use of the compound and to the rubber ingredient thereof, for example, natural rubber or synthetic rubber.

In carrying out all of the above objects it is still another object of the invention to provide a method for incorporating large quantities of channel black into rubber or rubberlike material.

Further objects and advantages of the present invention will be apparent from the following description.

There has been a need for suitable cement compositions for providing an adhesion bond between rubber or rubberlike material and metal parts. Heretofore numerous attempts have been made to formulate such a cement but for the most part the results are limited to bonds wherein the metal part is brass plated and wherein a perfect coating of brass over the metal is necessary to obtain a consistently good bond. This type of bond has proved satisfactory but is expensive and requires critical control in order that perfect brass plate is obtained. Other cement types of bonds are utilized wherein the thermoplasticity of the bond is not satisfactory or wherein toxic solvents and thinners or expensive solvents and thinners have been used. The present invention is directed to a cement which eliminates the prior difficulties in that it is inexpensive, utilizes petroleum naphtha solvents in most formulations and will provide a strong bond when used with or without brass plating and will provide extremely good bonds with brass plating wherein the continuity of the plating is not sufficiently satisfactory to provide a good bond with the prior art cements. In other words, the use of the brass plating will improve the strength of the bond but the cement may be used without the brass plate if desired, but in any case no critical control is required in the plating since the continuous plate is not necessary to success.

The invention is primarily concerned with a cement composition composed of rubber or synthetic rubber and channel carbon black wherein channel carbon black is incorporated in the rubber in quantities greater than 100% of the rubber together with a suitable solvent to make the cement fluid. Channel carbon black is a hard type of carbon black which produces abrasion resistance in rubber and is highly reenforcing thereto. The mixture of rubber or synthetic rubber and channel carbon black is thinned to a suitable viscosity with a suitable rubber or synthetic rubber solvent such as petroleum naphtha or suitable aromatic solvents and may then be applied to the metal part to be cemented to rubber by brushing, spraying or dipping so as to obtain a coating of the cement on the metal part after which the part is pressed together with the uncured rubber compound under suitable pressure in a mold and cured at a suitable temperature to produce an adhesion bond having optimum characteristics. In some instances it may be desirable to use intermediate cements of conventional type rubber compounds or "tie gums." In some instances two coats of the cement may be desirable. In determining these factors it is best to use the trial method to obtain a bond of the desired strength. Bonds between rubber and unplated metal having a tensile strength in excess of 800 pounds per square inch have been obtained wherein the rubber stock is a 3200 pound per square inch type. In this instance a two coat treatment with the cement was utilized and the metal to which the rubber was bonded consisted of 1020 S. A. E. steel cleaned by grit blasting and acid dipping.

Neoprene stock, a synthetic rubber of the polymerized chloroprene series, having a specific gravity of 1.37, a hardness of 59, with an 1800 pounds per square inch tensile strength and 575% elongation at break was cemented to 1020 steel, grit blasted and electrocleaned and the adhesion was noted to be in the neighborhood of 550 lbs. per square inch. Using the same materials but with brass plate steel an increase of adhesion was noted and in this instance a 965 pounds per square inch adhesion was obtained.

Using a Buna S synthetic rubber stock of 1.16 specific gravity, 70 hardness, 2900 pounds per sq. inch tensile strength and 450% elongation at break it was possible to get an adhesion of 900 pounds per square inch on grit blasted brass plated 1020 S. A. E. steel. In all instances the tensile tests were carried out under the standard A. S. T. M. procedure. Another interesting fact is that natural rubber may be bonded to metal through the use of a synthetic rubber cement. For example, Buna S cement to be described in more detail hereinafter, gives an adhesion in excess of 1000 pounds per square inch in conjunction with natural rubber stock and brass plated steel wherein the rubber had a tensile strength of 4,000 pounds per square inch, an elongation of 575% at break and a hardness 64. All hardness figures noted herein are Shore durometer "A" readings.

One factor which is extremely important in connection with my invention has to do with the surface area of channel carbon black. Channel carbon blacks are colloidal carbons which have a wide range of particle sizes. I have found that the blacks which are suitable in connection with my invention are those having particle sizes ranging between 3 millimicrons and 100 millimicrons as measured by an electron microscope using the method disclosed in Rubber Chemistry and Technology, vol. 15, page 657 (1942), said article being written by W. P. Wiegand. I have found that the optimum results can be obtained by using a 28 millimicron carbon black in quantities of over 100% by weight of the rubber or rubber like material. However, I have also found that the millimicron size of carbon black may be reduced providing the total quantity of channel carbon black does not have a surface area substantially greater than the surface area of the preferred quantity of carbon black having a 28 millimicron size. In other words, in utilizing a formula having 100 parts rubber therein I have found that the channel carbon black of a 28 millimicron size may vary between 101 parts to 300 parts with good results. Thus, if a 21 millimicron carbon black is used it should be specifically noted that the surface area of the carbon black used should not exceed a surface area of a 28 millimicron carbon black within the range noted; since the surface area of the 21 millimicron carbon black is substantially greater it is obvious that the total weight must be cut down. Similarly, larger carbon blacks may be utilized, but here again the same factors must be taken into consideration. In some instances it is highly desirable to use a mixture, for example, when using in the neighborhood of 100 parts of rubber a satisfactory cement has been made up using 104 parts of 25 millimicron carbon black and 26 parts of 3 millimicron carbon black. In this instance the total surface area is within the limits noted, namely, within the limits of the surface area determined by 28 millimicron carbon black in the range above mentioned.

Specifically various formulas of compounds may be made all of which will be satisfactory under one or more conditions of use, but as previously noted in each case it is desirable to make up the compound and test it for this specific use in order to determine which compound will yield the most satisfactory results. In connection with natural rubber the following formula giving a range of ingredients has yielded very satisfactory results and it should be noted in this formula and in succeeding formulas where no mention of the particle size of channel carbon black is noted that the carbon black should be a 28 millimicron carbon black or quantities of carbon black or mixtures of different blacks of other millimicron sizes having equivalent surface areas.

|  | Parts |
|---|---|
| Rubber | 10 |
| Cyclized rubber or other resinous material | 0 to 30 |
| Plasticizer | 0 to 20 |
| Activator | 0 to 20 |
| Age resistor | 0 to 5 |
| Channel carbon black | 11 to 30 |
| Sulphur | 0 to 10 |
| Suitable solvent as required | |

In the above formula where an activator, such as zinc oxide, is used toward the upper end of the range, the quantity of channel carbon black may be reduced in some instances since both ingredients act as a reenforcing agent to some extent. In all cases the quantities of rubber and channel carbon black must be in excess of the quantity of the other ingredients and the composition must be compounded so as to produce a rubber to metal adhesion cement after curing under pressure. While the above formula gives a wide variation in the quantities of ingredients to be used, it will be noted that the main ingredients are rubber and channel carbon black together with the solvent and these are the important ingredients and form the basis of the formula. The plasticizer used may be di-butyl phthalate or similar compounds. The activator is preferably zinc oxide, the age resistor is preferably symmetrical di-beta-naphthyl paraphenylenediamine.

In the preferred type of compound a horny, resinous material is incorporated with the rubber such material preferably being cyclized rubber which is sold under the trade name of "Pliolite" which is a product of rubber with tin-tetra-chloride or chlorostannic acid added wherein the rubber is cyclized with the tin compound with the addition of heat and a solvent. The grade preferred is a horny, tough material which is relatively brittle at room temperature. Other materials such as hardened wood resin may be substituted for this cyclized rubber with satisfactory results as well as other rubber derivatives which act as stiffening fillers. The preferred formulas which have been utilized with great success are as follows:

|  | Parts |
|---|---|
| Chemically plasticized rubber | 20.5 |
| Cyclized rubber | 16.6 |
| Dibutyl phthalate | 8.6 |
| Zinc oxide (Fr. process) | 1.0 |
| Sym. di-beta-naphthyl-para-phenylenediamine | 0.8 |
| Channel carbon black (28 millimicron) | 51.5 |
| Sulphur | 1.0 |
| Suitable solvent to secure desired viscosity. | |

| | Parts |
|---|---|
| Plasticized rubber | 20 |
| Cyclized rubber (Pliolite) | 16 |
| Plasticizer | 8 |
| Zinc oxide | 1 |
| Channel carbon black (28 m. micron) | 51 |
| Sulphur | 1 |
| Suitable solvent to secure desired viscosity. | |

When using a synthetic rubber such as neoprene the following formula with ranges of ingredients is given:

| | Parts |
|---|---|
| Neoprene (CG type) | 100 |
| Plasticizer (di-butyl-phthalate) | 0–150 |
| French process zinc oxide | 0–20 |
| Light calcined magnesia | 0–20 |
| Channel carbon black (28 millimicron) | 101–300 |
| Suitable solvent as required | |

The ingredient in this formula may vary for its specific use and in connection with the specific materials to be bonded. A preferred formula for a neoprene cement is as follows:

| | Parts |
|---|---|
| Neoprene (CG type) | 175 |
| Di-butyl phthalate | 63 |
| French process zinc oxide | 10 |
| Light calcined magnesia | 10 |
| Channel carbon black (28 millimicron) | 450 |
| Suitable solvent as required | |

When using a Buna S type synthetic rubber the following formula with ranges of ingredients may be used:

| | Parts |
|---|---|
| Buna S rubber | 50 |
| French process zinc oxide | 0–20 |
| Plasticizer (di-butyl phthalate) | 0–100 |
| Ager (symmetrical di-beta-naphthyl-para-phenylenediamine) | 0–20 |
| Sulphur | 0–40 |
| Channel carbon black (28 millimicron) | 51–150 |
| Suitable solvent as required | |

Two specific formulas of the Buna S type adhesive which have yielded exceptionally good results are as follows:

Formula 1

| | Parts |
|---|---|
| Buna S rubber | 200 |
| French process zinc oxide | 10 |
| Di-butyl-phthalate | 130 |
| Symmetrical di-beta-naphthyl-para-phenylenediamine | 10 |
| Sulphur | 20 |
| Channel carbon black (25 millimicron size) | 425 |
| Suitable solvent as required | |

Formula 2

| | |
|---|---|
| Buna S rubber | 92 |
| Zinc oxide | 3 |
| Di-butyl-phthalate | 32 |
| Symmetrical di-beta-naphthyl-para-phenylenediamine | 3 |
| Sulphur | 8 |
| Channel carbon black (25 millimicron size) | 104 |
| Channel carbon black (3 millimicron) | 26 |
| Mercapto-benzo-thiazole (accelerator) | 3 |
| Suitable solvent as required. | |

In the foregoing Buna S formula it has been found that Buna N type rubber may be substituted together with a 28 millimicron carbon black and a solvent of the benzol-toluene family. However, the Buna N type cements are of chalky consistency when dried and, therefore, do not provide as satisfactory a bond as do the Buna S type cements. However, Buna N cements have pulled up to 800 pounds per square inch on brass plate on adhesion tests and under some conditions may be used.

The method of manufacturing the compositions set forth herein is of particular importance and so far as I am aware the method to be described hereinafter is the only method by which large quantities of channel carbon black as noted, can be incorporated with rubber, or synthetic rubbers. I found it impossible to combine these two materials satisfactorily in the quantities noted on an ordinary rubber mill and have found it necessary to provide an entirely new method. The only satisfactory way to my knowledge of making this composition is to take the dry ingredients namely, rubber and channel carbon black with or without the other materials and place them in an internal type mixer of the "Werner Pfleiderer" type and close the mixer except for a vent and solvent inlet. The mixer is preferably cooled by running a cooling fluid through the jacket thereof. The mixer is then started and solvent is fed in small increments at short intervals of time until the mix approximates a heavy paste or dough, whereupon the addition of solvent can be increased until a smooth homogeneous cement results. It is important that the rate of addition of the solvent and the quantities of the additions are carefully controlled, otherwise the cement will not be of the best quality attainable by this method. A specific example in the manufacture of cement by the above noted process is as follows:

The rubber ingredient, channel carbon black, etc., are added in the dry state to a .7 gallon Werner Pfleiderer mixer equipped with kneading blades, and in this instance a total non-volatile weight of 750 grams is utilized. The mixer is started and 2 cc. of petroleum naphtha solvent are added each minute until the desired dilution is reached. As the dough forms and thins the dilution may be accelerated, that is the rate of 2 cc. per minute may be increased to speed the dilution. In this instance a 2 cc. addition of solvent may occur each minute or 2 cc. of solvent may be added during a minute period, even though the addition is continuous, in all cases the important factor being that the solvent is added slowly according to a predetermined schedule and in small quantities over an extended period of time since it is especially necessary that the solvent is thoroughly mixed and that there is never a sufficient quantity present to cause the mixture to be lumpy. Different solvent feed schedules may be used, but the optimum cycle should be determined for each formula by trial.

In the foregoing, it will be apparent that I have provided a new cement and method for making the same which provides strong adhesion bonds between rubber or synthetic rubber and metal parts when applied thereto and which cement is relatively inexpensive to manufacture and when manufactured by the method disclosed herein is relatively easy to compound.

In the appended claims the words "rubberlike material" or "rubber ingredient" etc., include that class of compounds comprising natural rubbers, neoprene, Buna S type synthetic rubber or Buna N type synthetic rubber, or any synthetic polymer or co-polymer corresponding to rubber.

While the embodiments of the present invention as herein disclosed, constitute preferred forms, it is to be understood that other forms might be adopted, all coming within the scope of the claims which follow.

What is claimed is as follows:

1. A liquid rubber composition adapted to be used as a cement between rubberlike materials and metal parts comprising: natural rubber—20 parts; cyclized rubber—16 parts; a plasticizer—8 parts; zinc oxide—1 part; channel carbon black—51 parts, said channel carbon black being of a 28 millimicron size or its surface area equivalent wherein the particle size of the channel carbon black may vary between 3 to 100 millimicrons; sulphur one part together with a solvent for the natural rubber and cyclized rubber.

2. A liquid rubber composition adapted to be used as a cement between rubberlike material and metal parts comprising: natural rubber 20.5 parts, cyclized rubber 16.6 parts, channel carbon black, 51.5 parts, said channel carbon black being of a 28 millimicron size or its surface area equivalent wherein the particle size may vary between 3 and 100 millimicrons mixed with a plasticizer, activator, age resistor and vulcanizer, said ingredients being in a fluid condition through the action of a solvent for the rubber and cyclized rubber.

3. A liquid rubberlike composition adapted to be used as a cement between rubberlike materials and metal parts comprising; a rubbery ingredient, selected from the class consisting of natural rubber, polychloroprene and butadiene styrene co-polymer 100 parts, and having incorporated therein channel carbon black in excess of the rubbery ingredient, wherein the channel carbon black has a particle size within the range of 3 to 100 millimicrons, the quantity of said channel carbon black having a surface area equal to the surface area of from 101 to 300 parts of a 28 millimicron particle size channel carbon black, and a solvent for the rubbery ingredient.

4. A liquid rubberlike composition adapted to be used as a cement between rubberlike materials and metal parts comprising; an elastomer, consisting of, a butadiene-styrene co-polymer 100 parts, and having incorporated therein channel carbon black in excess of the co-polymer wherein the channel carbon black has a particle size within a range of from 3 to 100 millimicrons, the quantity of said channel carbon black having a surface area equal to the surface area of from 101 to 300 parts of a 28 millimicron particle size channel black, and a solvent for the copolymer.

5. In a method of making rubberlike cement including a rubberlike material, consisting of; butadiene styrene co-polymer together with channel carbon black having a particle size of from 3 to 100 millimicron in quantities in excess of the co-polymer wherein the quantity of channel black has a surface area equal to the surface area of 101 to 300 parts of a 28 millimicron particle size channel carbon black, the steps comprising: supplying all of the co-polymer and channel carbon black in the dry state to an internal type mixer, mixing the two ingredients and simultaneously adding measured small quantities of a solvent for the co-polymer until the mixture becomes a smooth dough-like consistency, and then increasing the addition of solvent and continuing the mixing until the consistency of the mixture is that desired.

6. A liquid rubberlike composition adapted to be used as a cement between rubberlike materials and metal parts, comprising in combination; rubber 100 parts and channel carbon black in excess of the rubber, wherein the channel carbon black has a particle size within a range of 3 to 100 millimicrons, the quantity of said channel carbon black being equal in surface area to from 101 to 300 parts of a 28 millimicron size channel carbon black, and a solvent for the rubber.

7. A liquid rubberlike composition adapted to be used as a cement between rubberlike materials and metal parts, comprising in combination; polychloroprene, 100 parts and channel carbon black in excess of the polychloroprene wherein the channel carbon black has a particle size within a range of 3 to 100 millimicrons, the quantity of said channel carbon black being equal in surface area to from 101 to 300 parts of a 28 millimicron size channel carbon black, and a solvent for the polychloroprene.

STEWART L. BRAMS.

REFERENCES CITED

The following references are of record in the file of this patent:

UNITED STATES PATENTS

| Number | Name | Date |
| --- | --- | --- |
| 2,161,201 | Schaefer | June 6, 1939 |
| 2,342,313 | Van Nimwegen | Feb. 22, 1944 |
| 2,089,809 | Penning | Aug. 10, 1937 |
| 2,183,330 | Drew | Dec. 12, 1939 |
| 2,233,985 | Knowland et al. | Mar. 4, 1941 |